US007162369B2

(12) United States Patent

Thorne

(10) Patent No.: US 7,162,369 B2
(45) Date of Patent: Jan. 9, 2007

(54) SPEED-MONITORING RADAR-ACTIVATED BRAKE LIGHT

(75) Inventor: Steve Thorne, 3315 Grand Ave., Oakland, CA (US) 94610

(73) Assignee: Steve Thorne, Oakland, CA (US)

( * ) Notice: Subject to any disclaimer, the term of this patent is extended or adjusted under 35 U.S.C. 154(b) by 0 days.

(21) Appl. No.: 10/602,451

(22) Filed: Jun. 24, 2003

(65) Prior Publication Data

US 2004/0267453 A1 Dec. 30, 2004

(51) Int. Cl.
*G08G 1/16* (2006.01)
*B60Q 1/02* (2006.01)

(52) U.S. Cl. .......................... 701/301; 701/93; 701/96; 340/435; 340/436; 340/903

(58) Field of Classification Search ................ 701/301, 701/23–24, 28, 96, 93, 36; 340/425.5, 435, 340/436, 903; 348/118; 342/42
See application file for complete search history.

(56) References Cited

U.S. PATENT DOCUMENTS 5,504,472 A * 4/1996 Wilson ....................... 340/479
5,865,265 A * 2/1999 Matsumoto ................. 180/169
6,032,097 A * 2/2000 Iihoshi et al. ................. 701/96
6,420,996 B1 * 7/2002 Stopczynski et al. ......... 342/70

* cited by examiner

*Primary Examiner*—Y. Beaulieu

(57) ABSTRACT

A radar activated brake light device to be integrated into a vehicle to alert drivers of potentially hazardous changes in traffic speed consisting of a radar device to measure the speed of a forward vehicle; a sensor input from the speedometer of the radar-equipped vehicle; a computer processor to evaluate the data for potentially hazardous speed changes; a luminous display mounted on the radar-equipped vehicle to warn the driver of a trailing vehicle; and, optionally, a warning light and warning buzzer mounted internally to the radar-equipped vehicle to alert the driver of the radar-equipped vehicle of potentially hazardous speed changes.

1 Claim, 2 Drawing Sheets

SPEED-MONITORING RADAR-ACTIVATED BRAKE LIGHT

FIELD OF THE INVENTION

This invention relates to the fields of vehicular flow, radar devices, and alert mechanisms. Specifically, this invention relates to devices used to alert the driver of a moving vehicle of sudden changes in traffic speed for the purpose of reducing the likelihood of a collision.

BACKGROUND AND PRIOR ART

Vehicular travel has become more hazardous in the last half-century due to an increased density of vehicles on the roadways. Vehicles often travel at separation distances too short to allow sufficient braking time should the forward traffic suddenly slow. With the higher percentage of larger vehicles on the roadways, clear view of the road has been increasingly obstructed—further reducing the time a driver has to react to sudden reductions in traffic speed.

There have been many devices in the prior art that have been proposed to reduce the risk of collision. Many of these ideas involve the use of radar. One of the earliest uses of radar to assist with vehicle safety was described in U.S. Pat. No. 2,851,120 issued to Fogiel back in September of 1958, wherein a range finder and calculating device determines a safe traveling distance for the vehicle and applies automatic braking when vehicles move within that range. Numerous subsequent patents such as U.S. Pat. No. 3,898,652 issued August 1975 to Rashid, U.S. Pat. No. 3,710,383 issued January 1973 to Cherry et al and U.S. Pat. No. 3,778,826 issued December 1973 to Flannery et al also combine radar with automatic braking mechanisms. U.S. Pat. No. 5,381,338 issued to Wysocki et al in 1995 and U.S. Pat. No. 6,487,500 issued to Lemelson and Pedersen in November 2002 describe inventions utilizing the global positioning system together with inter-vehicle communications to monitor traffic flow and, in the case of Lemelson and Pedersen, initiate an automatic controlled braking of the vehicle.

U.S. Pat. No. 5,014,200 issued May 1991 to Chundrlik et al and assigned to General Motors Corp., and U.S. Pat. No. 4,621,705 issued November 1986 to Etoh and assigned to Nissan Motor Company each involve systems utilizing radar for automatically controlling vehicle speeds to maintain safe vehicle separation.

Numerous patents involve systems that provide the driver of the vehicle with information about the safe stopping distances between vehicles and other objects. These include U.S. Pat. No. 3,984,836 issued October 1976 to Oishi et al wherein relative distance separations are indicated on an instrument panel, and U.S. Pat. No. 3,850,041 issued November 1974 to Seaman wherein a light beam projected forward of the vehicle indicates the required safe stopping distance. U.S. Pat. No. 5,357,438 issued October 1994 issued to Davidian describes a device which includes a speed sensor, a space sensor, and a control panel with means to input parameters concerning the vehicle, the condition of the road, the daylight condition, and even a 'condition-of-driver' parameter each used to help calculate a 'danger-of-collision distance' to nearby objects.

And U.S. Pat. No. 5,369,591 issued to Broxmeyer in 1994 describes a system for 'longitudinal control and collision avoidance' wherein magnets are embedded in both the roadway and the vehicle with position sensors broadcasting by radio the vehicle's position to local receiving stations and then receiving, in return, an audio feedback command for directions for safe maneuvering.

Each of the above mentioned patents—together with numerous other patent variations not listed above—are successful in meeting their stated objects to some degree. However, none have yet to be successfully integrated into today's vehicles and roadways to any significant extent because they either involve technology that is too complicated, or propose implementing systems that are not financially viable for society at this time, or are systems which are activated by the wrong parameter. In the patent issued to Davidian, for example, a 'danger-of-collision distance' parameter is used and when the measured distance of an object is equal to or less than this value, a collision alarm is activated. The fallacy in using distance as a parameter for activating an alarm is that the traffic patterns vary so frequently when driving that, it becomes a useless parameter to monitor. For instance, when a safe 'danger-of-collision distance' is computed for a vehicle traveling at 60 miles per hour, the value may be useful to apply when a vehicle is traveling down a sparsely traveled highway—for the alarm will notify the driver when an object is closer than this distance—however, when the same vehicle then encounters a dense traffic pattern the distance separating vehicles may always be shorter than the 'danger-of-collision' distance in which case the alarm will always be activated. The system then fails to be able to provide any new information when a sudden speed change occurs. When vehicles are traveling almost bumper-to bumper at full highway speed, then it becomes even more imperative that the speed change be the deciding parameter to convey to a trailing vehicle—not the distance. If, alternatively, the 'danger-of-collision' distance is set to a shortened value for dense traffic, then the moment the traffic opens up, the shorten distance will no longer give warnings about speed changes beyond that distance proving to be a liability to the driver expecting a warning. Another problem with using distance as the deciding parameter to activate a warning is that adjacent vehicles may be adjusting their speeds at the same rate in which case their relative separations may remain constant—masking the fact that the forward traffic is also slowing.

In summary, the danger from collisions on the roadways has not been alleviated by any of these prior art inventions. Ironically, despite the plethora of innovative ideas within the patent records, the best mechanism which exists today for alerting a driver of changes in the forward traffic flow are the standard brake lights found on all vehicles—and this prior art feature has been incorporated into vehicles for over 80 years.

The prior art in brake lights, however, has four inherent deficiencies that can contribute to the problem of vehicular collision. First, they require the driver of the vehicle to observe the sudden change in speed in the forward vehicle. If the driver is not paying attention to the roadway, or does not have good visibility of the forward roadway, then they may not apply the brakes—and activate the vehicle's brake light—until much of the free space forward of the vehicle has been traversed. Secondly, the driver must use their judgment to decide whether the traffic speed change warrants applying their brake. Often a driver's judgment is incorrect and the brake lights are not activated until a collision becomes imminent. Thirdly, there can be a loss of a second or more due to the reaction time between the instant when even an alert driver recognizes a change in speed in the forward vehicle and the moment when the driver actually applies the brake activating their brake light. And fourthly, frequently the driver of a vehicle may be resting their foot on the brake pedal or lightly applying the brake and falsely indicating to the driver of a trailing vehicle of a reduction in speed—and eliminating the opportunity to later initiate a meaningful braking warning.

Although it is the speed changes that are most important to a driver, there exists no viable alternative to the operatorinitiated prior art brake light for communicating information about the speed of a forward vehicle to the driver of a trailing vehicle.

Objectives and Advantages of the Invention

Accordingly, several objectives and advantages of the present invention are:

(a) to provide a unique device, integral with a vehicle, that can monitor the relative speed of a vehicle forward of the host vehicle. And, upon recognition of potentially hazardous changes in vehicle speed, alert the driver of a trailing vehicle and the driver of the host vehicle of the hazard;

(b) to provide a unique device, integral with a vehicle, that can alert the driver of a trailing vehicle and the driver of the host vehicle of a change in the traffic speed that is not dependent upon the attentiveness, the judgment, or the reactions of the driver of the host vehicle;

(c) to provide a unique device, integral with a vehicle, that can alert the driver of a trailing vehicle and the driver of the host vehicle of a change in the traffic speed independently of other mechanisms placed either on other vehicles, or on the roadway.

Further objects and advantages of this invention will become apparent from a consideration of the drawings and the ensuing description.

SUMMARY OF THE INVENTION

The stated objectives and advantages are accomplished by uniquely integrating into a vehicle a radar device to measure the speed of a forward vehicle; a sensor input from the speedometer of the host vehicle; a computer processor to evaluate the data for potentially hazardous speed changes; a luminous display mounted on the radar-equipped vehicle to warn the driver of a trailing vehicle; and, optionally, a warning light and warning buzzer mounted internally to the radar-equipped vehicle to alert the driver of the host vehicle of potentially hazardous speed changes.

REFERENCE NUMERALS USED IN THE DRAWINGS

| | |
|---|---|
| 5 | roadway |
| 10 | forward vehicle |
| 20 | host vehicle |
| 22 | front radar |
| 24 | front radar signal |
| 26 | speedometer sensor |
| 28 | CPU |
| 30 | luminous display |
| 36 | dashboard warning light |
| 38 | warning buzzer |
| 40 | prior art brake lights |
| 50 | trailing vehicle |

Description of the Preferred Operation of the Invention

Figure 2:
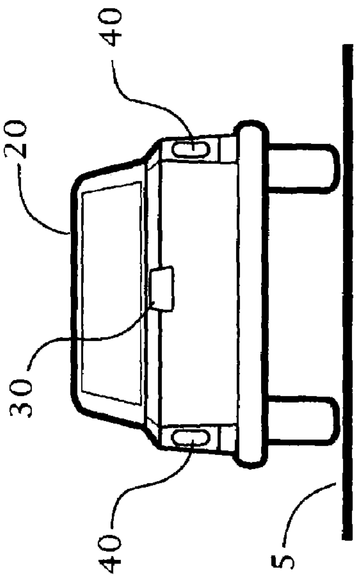
FIG. 2 is an elevational view the same embodiment of the invention as viewed from the rear of the vehicle.
Figure 1:
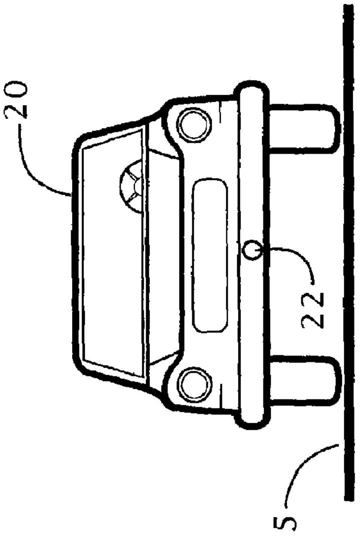
FIG. 1 is an elevational view of the preferred embodiment of the invention as incorporated into a vehicle as viewed from the front of the vehicle.
Figure 3:
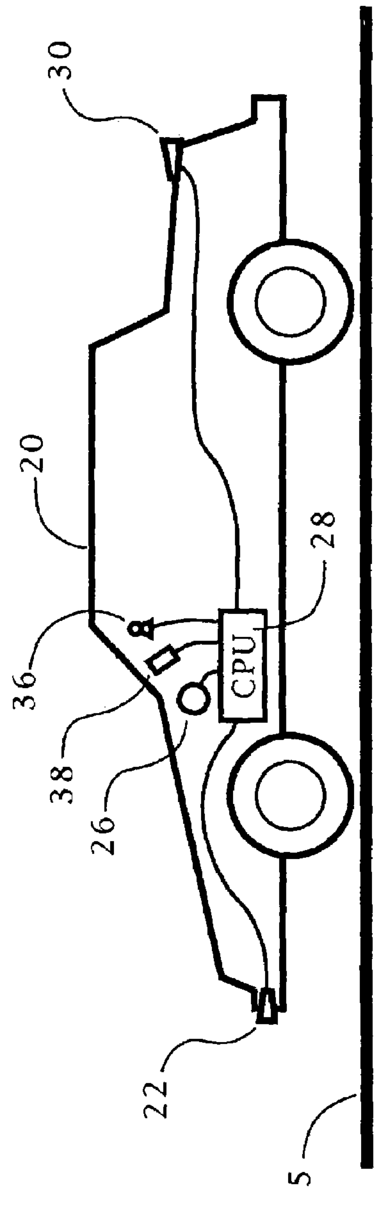
FIG. 3 is a schematic diagram of the same embodiment of the invention viewed from the side of the vehicle.
Figure 4:
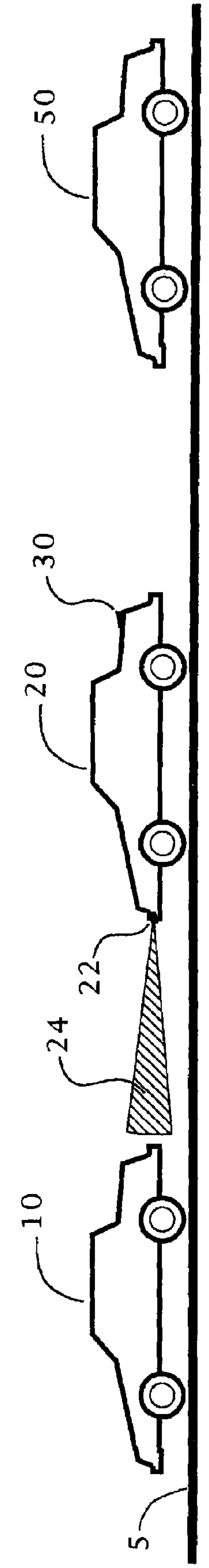
FIG. 4 is an elevational view of the same embodiment of the invention as incorporated into a vehicle positioned on a roadway traveling between two other vehicles.

FIGS. 1, 2, 3, and 4 show the preferred embodiment of the invention incorporated into host vehicle 20 positioned on roadway 5. Front radar 22 reflects front radar signal 24 off forward vehicle 10 to ascertain the speed of forward vehicle 10 relative to host vehicle 20. Relative-speed data measured by front radar 22, together with the road-speed data of host vehicle 20 registered by speedometer sensor 26 is sent to CPU 28 allowing for the computation of the road-speed of forward vehicle 10—that is —the speed of forward vehicle 10 relative to roadway 5. CPU 28 monitors the derived road-speed of forward vehicle 10 and when a significant reduction is detected activates luminous display 30. CPU 28 optionally activates dashboard warning light 36 positioned on the dashboard of the host vehicle 20 and, if the road-speed reduction is very rapid, warning buzzer 38. Luminous display 30 is of sufficient brightness and so positioned on host vehicle 20 to be visible to the driver of trailing vehicle 50. In this preferred embodiment luminous display 30 is a rear-mounted light noticeably different in color from the red color of prior art brake lights 40.

Ramifications of the Invention

The reader will see that when the speed-monitoring radar-activated brake light of this invention is incorporated into a vehicle, it can provide information which would otherwise not be obtainable to the driver of trailing vehicle 50 about traffic speed forward of host vehicle 20 simply by observing luminous display 30. The driver of trailing vehicle 50 can be alerted to the speed changes two vehicles forward of their vehicle rather than only alerted to speed changes one vehicle forward that prior art brake lights 40 provide. This is especially important when either the size of host vehicle 20 is large and obscures most of the trailing driver's view to the forward roadway or when weather conditions decrease visibility such that a driver cannot see further forward than to the rear of the vehicle directly in front.

It is critical to the understanding of this invention that luminous display 30 is seen as always providing real-time information about speed changes in forward vehicle 10 directly to the driver of trailing vehicle 50. It is information about the speed change that is most valuable to the driver of trailing vehicle 50. Often, in heavy traffic, the relative spacing between vehicles is shorter than that required for safe stopping, however, it is not the stopping distance which is essential to monitor because many rear-end collisions occur before both vehicles have stopped. Rather, it is the relative speeds of the vehicles that must be maintained, and the more quickly the driver of trailing vehicle 50 is made aware of the forward speed changes, the more likely the speed of the trailing vehicle 50 can be reduced to match the forward flow. It is also critical to the functioning of this invention that luminous display 30 is always understood to be associated directly with speed changes without the need for interpretation by the driver of trailing vehicle 50. If the driver of trailing vehicle 50 has to contemplate whether the observed signal from luminous display 30 is due to anything other than a forward speed change—such as simply a tighter vehicle spacing, or possibly the condition of the forward driver—then there is an opportunity for the signal to be misinterpreted or ignored thus negating the object and advantage of this invention. Just as the observation of prior art brake lights 40 being activated is understood by all drivers to mean that the driver of the vehicle directly in front has applied their brakes, the observation of luminous display 30 being activated is always to be understood to mean that the driver of the vehicle two cars in front has applied their brakes. The speed-monitoring radar-activated brake light device of this invention works in tandem with prior art brake lights to give a trailing driver a more accurate view of the forward traffic speed fluctuations.

When traveling on crowded roadways, occupants within a vehicle equipped with this invention are thus potentially more safe than occupants within the same vehicle not equipped with this invention because the driver of a trailing vehicle will be better informed of speed reductions in the forward traffic flow and the likelihood of a rear-end collision will be reduced.

It can be seen that the speed-monitoring radar-activated brake light device of this invention works independently of the driver of host vehicle 20, and thus it's operating efficiency is not affected by the attentiveness, the judgment, or the reaction time of said driver.

Further, it can be seen that the speed-monitoring radar-activated brake light device of this invention works independently of the need for any other mechanism placed on other vehicles or along the roadways, and therefore can be implemented without universal changes to all vehicles or large expenditures modifying the roadways. And because this invention can operate independently of mechanisms external to host vehicle 20, it is not prone to system failures that often occur in interdependent mechanisms.

Although the description above contains much specificity, it should not be construed as limiting the scope of the invention but as merely providing illustrations of the presently preferred embodiment of this invention. For example, pertaining to luminous display 30, it is to be understood that this display might be a single light different in color from the red brake lights of the prior art, it might be a series of lights with different colors or brightness to indicate different hazardous conditions, or it might be a lighted display screen capable of conveying a text message. It is to be further understood that although activation of luminous display 30 is always by detection of a speed change in forward vehicle 10 it is optional in the programming of CPU 28 that there be a minimum change in speed before such activation is made.

It should be understood that dashboard warning light 36 does not have to be mounted directly on the dashboard as long as it is positioned to be easily observed by the driver of host vehicle 20. Further, dashboard warning light 36, warning buzzer 38, and luminous display 30 do not need to be activated simultaneously, for there are numerous driving situations where the driver of trailing vehicle 50 and the driver of host vehicle 20 might be alerted separately or at different moments.

The speed of host vehicle 20 used to compute the road-speed of forward vehicle 10 may also be obtained utilizing the global positioning system rather than through speedometer sensor 26.

And it should be understood that the conveyance of data from independent components on this invention does not have to be by wires—for there are numerous wireless methods of communication available today. It should also be realized that power to run the components comprising this invention is easily obtainable in a manner integral with host vehicle 20 simply by tapping into the existing vehicle battery or, optionally, by providing a separate replaceable battery.

Accordingly, the scope of the invention should be determined not by the embodiments illustrated, but by the appended claims and their legal equivalents.

I claim:

1. A device for alerting the driver of a vehicle trailing a host vehicle when a forward traveling vehicle forward of said host vehicle is decelerating comprising:

(a) a radar device, mounted integrally with said host vehicle, with means to continuously measure a relative speed of said forward vehicle relative to said host vehicle;

(b) a CPU, mounted integrally with said host vehicle, with means to ascertain a relative acceleration from said relative speed, with further means to ascertain said host vehicle's acceleration relative to the road from data provided by electronic connection to said host vehicle's speedometer system, with further means to derive an absolute acceleration of said forward vehicle relative to the road by computing the mathematical sum of said relative acceleration plus said host vehicle's acceleration, and with further means to continuously monitor said absolute acceleration for significant negative values;

(c) a CPU controllable luminous display, mounted integrally with said host vehicle, sufficiently bright and strategically positioned to be visible to the driver of a vehicle trailing said host vehicle, activated whenever a significant negative value in said absolute acceleration of said forward vehicle occurs.

* * * * *